H. S. HUNT.
CONDUIT.
APPLICATION FILED APR. 10, 1911.

1,041,290.

Patented Oct. 15, 1912.
2 SHEETS—SHEET 1.

Witnesses
O. B. Baenziger.
T. G. Howlett.

Inventor
Horace S. Hunt.
By E. S. Wheeler,
Attorney.

H. S. HUNT.
CONDUIT.
APPLICATION FILED APR. 10, 1911.

1,041,290.

Patented Oct. 15, 1912.

2 SHEETS—SHEET 2.

Witnesses
Q. B. Baenziger.
J. G. Howlett.

Inventor
Horace S. Hunt.
By E. S. Wheeler
Attorney.

UNITED STATES PATENT OFFICE.

HORACE S. HUNT, OF JACKSON, MICHIGAN.

CONDUIT.

1,041,290.   Specification of Letters Patent.   Patented Oct. 15, 1912.

Application filed April 10, 1911. Serial No. 619,961.

*To all whom it may concern:*

Be it known that I, HORACE S. HUNT, a citizen of the United States, residing at Jackson, in the county of Jackson, State of Michigan, have invented certain new and useful Improvements in Conduits; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to metal lined concrete conduits for the conduction and distribution of liquids and fluids under pressure, and consists in the construction and arrangement of parts hereinafter more fully set forth and pointed out particularly in the claims.

The object of the invention is to provide simple and efficient means for effecting a metallic joint between the ends of the sections of metal lining of concrete conduits for the purpose of rendering such conduits and the joints between the sections thereof impermeable to liquids and fluids, provision being made by the manner in which the ends of the sections of metal lining are joined for tying together the ends of the tubular sections forming the pipe or conduit in a manner to maintain a tight joint and resist longitudinal stress.

The above object is attained by the structure illustrated in the accompanying drawings, in which:—

Figure 1:
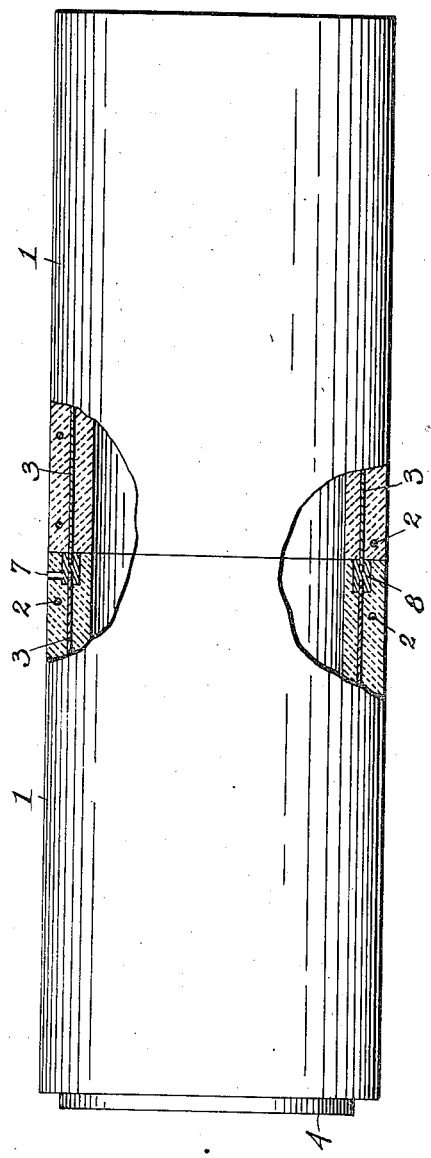
Figure 2:
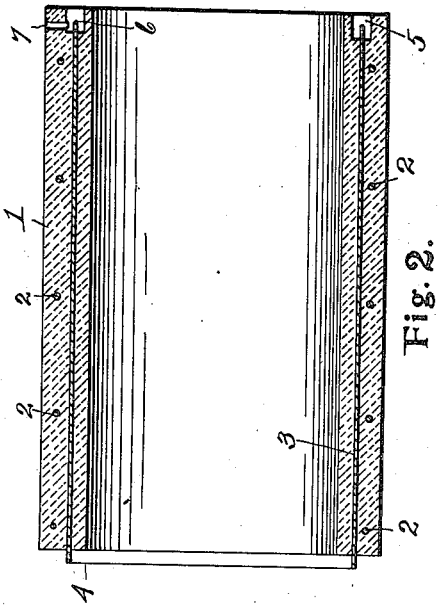
Figure 3:
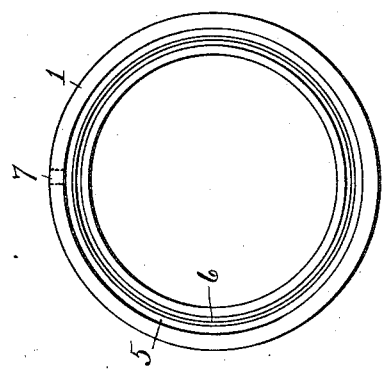
Figure 4:
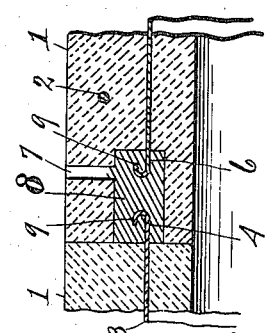
Figure 5:
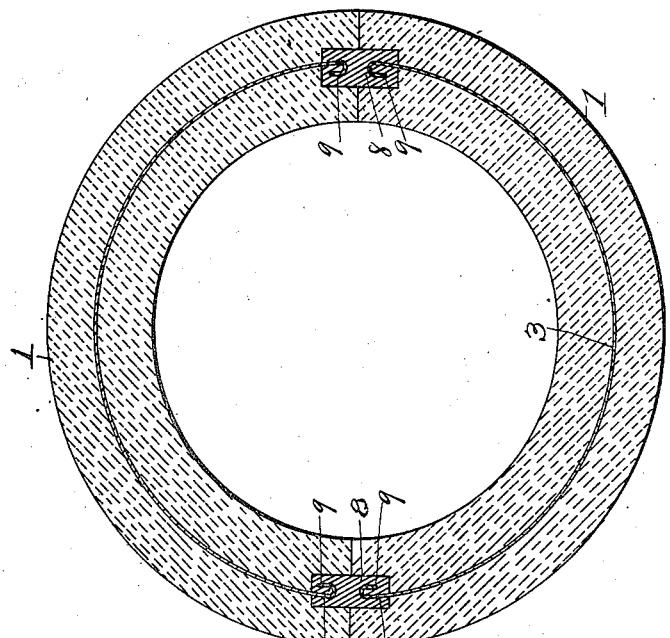
Figures 6, 7:
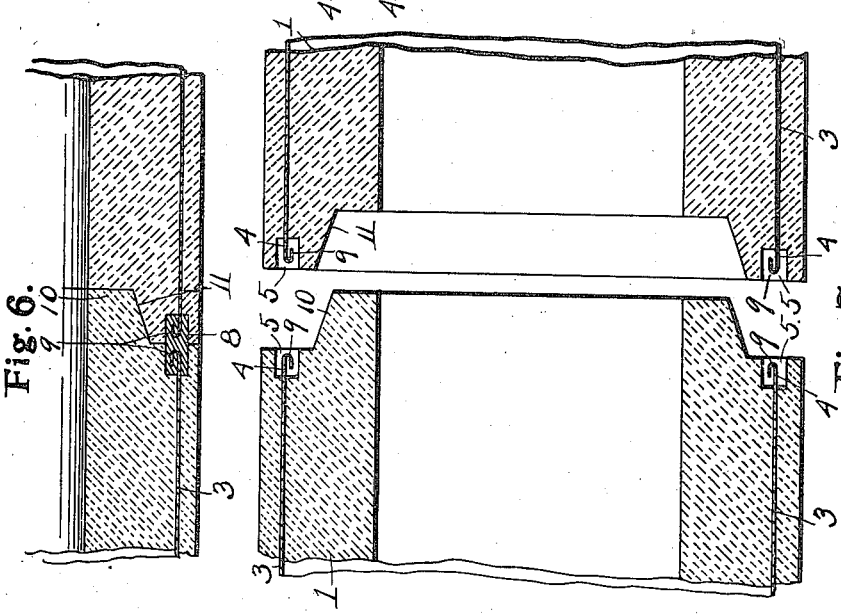

Figure 1 is an elevation, partly in section, showing the method of joining the meeting ends of concrete pipe sections in a manner to effect a metallic union between the ends of the sections of metal lining within said pipe sections. Fig. 2 is a longitudinal sectional view through one of the pipe sections with a section of metal lining embedded therein. Fig. 3 is an end elevation of a section of the conduit. Fig. 4 is an enlarged fragmentary view in section through the joint between the ends of two pipe sections, and through the end portions of the metal lining of said pipe sections, showing the manner, in a modified form, of effecting a metallic union between the ends of the sections of lining, and at the same time sealing the joint between the pipe sections. Fig. 5 is a transverse section through a conduit showing longitudinal joints between its component members, made in accordance with my invention, the character of the joint being slightly different from that shown in Figs. 1 and 4. Fig. 6 is a fragmentary view in section through the ends of sections of conduit joined transversely in accordance with my invention, the end portions of said sections being held from lateral displacement by a tapered tongue and coöperating beveled seat. Fig. 7 is a sectional view showing the parts forming the joint of Fig. 6, segregated.

Referring to the characters of reference, 1 designates the sections or units employed to form a concrete pipe or conduit. These sections may be provided against bursting strain by embedding in the cementitious wall thereof embracing steel bands or rings 2. In order that the conduit formed by these concrete pipe sections may be rendered impermeable to liquids and fluids so as to enable the conduit formed of said sections to be employed for conducting water and gases under pressure, there is attached to the inner wall of each section, or embedded therein a metal lining 3 of the contour of the pipe in cross section which will resist the passage of liquids or fluids through the wall of the conduit.

Difficulties have been experienced heretofore where concrete pipe sections having a metal lining have been used in effecting a tight joint or juncture between the meeting ends of the tubular members forming said lining, in a manner to prevent a leak at that point. I overcome these difficulties and effect a seal or tight joint between the ends of the tubular members forming the lining or impermeable stratum in the wall of the concrete sections by joining the registering ends 4 and 6 of the lining members in a closed channel 5 formed in or between the ends of the pipe sections when placed together. The tubular lining 3 is so disposed in the pipe section and the channel 5 is so formed as to leave exposed in said channel the end portions of said lining, when the pipe sections are placed end to end, as clearly shown in the drawings. In Figs. 1 to 4 inclusive the channel 5 is shown formed wholly in the end of one pipe section. In Figs. 5 to 7 inclusive said channel is shown between the ends or meeting faces of the pipe or conduit members.

Formed through the wall of the concrete body so as to communicate with the channel 5 is a sprue or ingate-opening 7 through which molten metal may be poured. To join the ends of the pipe sections and effect a metal bond between the ends of the tubular members forming the metallic lining after the pipe sections have been placed together to cause their ends to properly abut, molten metal is poured through the ingate-opening 7 in sufficient quantity to entirely fill the channel 5, thereby uniting the ends of the tubular lining members in a metal bond, as shown at 8, and at the same time joining the pipe sections together in a manner to prevent leakage between their abutting ends. The hardening of the molten metal in the channel 5 after it is poured, effects a continuity of the metal lining and forms a bond to join the pipe sections together, the arrangement being such that said bond becomes embedded in the concrete wall of the conduit in the same manner as are the tubular sections forming the metallic lining, whereby the bond is protected against the action of rust and acids.

Should it be desired to more firmly unite the ends of the tubular lining members, than by simply casting them in the metal bond 8, as shown in Fig. 1, the terminals of the tubular lining members may be flanged, as shown at 9 in Figs. 4, 5, 6 and 7, thereby insuring a firmer hold in said bond.

In Fig. 5 is illustrated a conduit formed by joining the component members thereof along longitudinal lines. This arrangement enables the lengths of pipe to be made of a plurality of longitudinal divisions or sections, which to complete the conduit are joined at their ends by the transverse joints shown in the other views.

By providing the lengths or sections of pipe with a tapered tongue or tenon 10 at one end and with a beveled recess or seat 11 at the other end to receive said tongue, as clearly shown in Figs. 6 and 7, provision is made for firmly uniting said sections when placed end to end and for holding them against lateral displacement.

While I have shown pipe of circular cross section as the preferred form, I would have it understood that the invention is applicable to pipe of any form in cross section.

Having thus fully set forth my invention, what I claim as new and desire to secure by Letters Patent, is:—

1. A cementitious pipe or conduit composed of tubular sections provided with a channel at their meeting ends which is closed when the sections are placed together in axial alinement, an impermeable lining for said pipe sections whose terminals lie in said channel, and a bond of fusible metal filling said channel and embedding the terminal of the lining sections therein to effect a metallic union between the ends of the sections of the impermeable lining and the continuity of said lining throughout the length of the conduit.

2. A cementitious pipe or conduit composed of tubular sections of uniform diameter throughout their entire length having a receiving channel between their abutting ends wholly within the plane of the main walls thereof, a thin metallic lining for said pipe sections having flanged terminals which lie in said channel when the sections are placed end to end, and a filling of fusible metal in said channel embracing the flanged terminals of the sections of lining to effect a metallic coupling between the ends thereof.

In testimony whereof, I sign this specification in the presence of two witnesses.

HORACE S. HUNT.

Witnesses:
Wm. W. Tefft,
John Bustraan.